US 8,634,322 B2
Jan. 21, 2014

(12) United States Patent
Bryant et al.

(54) APPARATUS AND METHODS FOR ADAPTIVE NETWORK THROTTLING

(75) Inventors: Matthew K. Bryant, Gastonia, NC (US); William H. McGraw, IV, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 153 days.

(21) Appl. No.: 13/400,064

(22) Filed: Feb. 18, 2012

(65) Prior Publication Data

US 2013/0215767 A1 Aug. 22, 2013

(51) Int. Cl.
*H04L 12/24* (2006.01)
*H04L 12/26* (2006.01)
*H04Q 11/04* (2006.01)

(52) U.S. Cl.
USPC ....... 370/252; 370/329; 370/395.42; 370/412

(58) Field of Classification Search
USPC .............................. 370/229–412; 725/31–36
See application file for complete search history.

(56) References Cited

U.S. PATENT DOCUMENTS

| | | | | |
|---|---|---|---|---|
| 4,553,251 | A * | 11/1985 | Hartmann | 375/365 |
| 6,198,750 | B1 * | 3/2001 | Buchholz et al. | 370/395.42 |
| 2003/0185154 | A1 * | 10/2003 | Mullendore et al. | 370/230 |
| 2005/0268335 | A1 * | 12/2005 | Le et al. | 726/13 |
| 2006/0041642 | A1 * | 2/2006 | Rosner et al. | 709/220 |
| 2006/0153153 | A1 * | 7/2006 | Bhagwat et al. | 370/338 |
| 2007/0162245 | A1 * | 7/2007 | Costea et al. | 702/100 |
| 2007/0280247 | A1 * | 12/2007 | Mera et al. | 370/392 |
| 2010/0042708 | A1 * | 2/2010 | Stamler et al. | 709/221 |
| 2013/0031576 | A1 * | 1/2013 | Koemmerling | 725/31 |
| 2013/0107891 | A1 * | 5/2013 | Ziegler | 370/429 |

* cited by examiner

*Primary Examiner* — Afsar M Qureshi
(74) *Attorney, Agent, or Firm* — Weiss & Arons LLP; Michael A. Springs, Esq.

(57) ABSTRACT

Apparatus and methods for adaptive network throttling are provided. Adaptive network throttling may allow a device to communicate information using a shared network link without negatively impacting other devices utilizing the shared link. Adaptive network throttling may regulate communication of each device independently of network link or device hardware specifications. Adaptive network throttling may ensure that each device utilizing the shared network link inserts a time delay following a communication of information. The time delay may represent bandwidth on the shared network link that is not being used by a device. The unused bandwidth may be available to other devices communicating over the shared network link.

25 Claims, 5 Drawing Sheets

APPARATUS AND METHODS FOR ADAPTIVE NETWORK THROTTLING

FIELD OF TECHNOLOGY

Aspects of the present disclosure relate to regulating bandwidth use of a device utilizing a shared network link.

BACKGROUND

A self-service terminal, such as an ATM, may provide banking customers the ability to access bank account information, deposit funds or withdraw funds. ATMs may obviate the need for a banking customer to consult a human clerk. Additionally, ATMs may be located in a variety of diverse locations remote from banking centers.

For example, ATMs may be placed on street corners, in convenience stores, supermarkets or sports arenas. The wide variety of possible locations for an ATM provides banking customers with access to cash and banking account information at convenient public locations.

To provide access to cash and banking account information, the ATM is typically connected, via a network link, to a remote computer (hereinafter "computer").

For example, an ATM customer may request a withdrawal of an amount of cash. The ATM may transmit a query to the computer asking whether the customer has a threshold balance in an account. The ATM may transmit the query utilizing one or more network links.

Upon receipt of the query, the computer may analyze a repository of banking account information and transmit a response to the ATM. The response of the computer may be transmitted utilizing one or more network links. Based on the response received from the computer, the ATM may dispense the requested amount of cash.

As a further example, the customer may access an ATM to deposit checks. The ATM may transmit or receive images of the checks to the computer utilizing one or more network links.

A network link utilized by the ATM may be shared with other devices. The other devices may transmit or receive information utilizing the shared network link. Each device utilizing the network link may receive or transmit information over the network link independently of other devices.

The network link may be associated with a bandwidth. The bandwidth may limit an amount of information or a rate of transmission over the network link. The bandwidth may constrain an ability of the ATM to timely respond to a customer request.

For example, the ATM may respond slowly to a customer request if there is a large amount of informational traffic traveling on the shared network link. The large amount of informational traffic may not leave sufficient bandwidth for the ATM to timely communicate with the computer.

As a further example, the ATM may respond slowly if the ATM transmits a large amount of information. The large amount of information transmitted by the ATM, together with other informational traffic traveling on the shared network link, may be close to, or exceed the bandwidth of the network link. As a result, the ATM may be unable to respond to a customer request in a timely manner.

Information travelling from to/from an ATM may be routed along multiple network links until the transmitted information reaches the computer. Each network link carrying the information may include a number of connected devices and a respective volume of informational traffic. Each network link may be associated with a respective bandwidth.

It may be difficult to ascertain a current status of a particular network link. It may be difficult to ascertain which network links are utilized to communicate information between the ATM and the computer.

For example, an ATM seeking to transmit information over a network link may not be aware of a number of connected devices, a volume of traffic on a particular network link or a bandwidth of a network link.

Furthermore, a network link may be controlled by a different entity from an entity responsible for operation of the ATM. The entity responsible for operation of the ATM may be unable to monitor a number of devices that share a network link, a bandwidth of a network link or a volume of traffic transmitted on a network link.

Despite difficult to predict conditions on a network link, it would be desirable for an ATM to timely respond to a customer request. It would be desirable, therefore, to provide apparatus and methods for adaptive network throttling.

SUMMARY

Apparatus and methods for adaptive network throttling are provided.

Apparatus may include one or more computer-readable media storing computer-executable instructions, that when executed by a processor on a computer system regulate communication of an ATM. The computer executable instructions may include instructions for: transmitting a first amount of data; measuring a first experienced bandwidth based on the transmitting of the first amount; transmitting a second amount of data; measuring a second experienced bandwidth based on the transmitting of the second amount; and selecting the second amount of data based on the first experienced bandwidth.

The apparatus may include computer executable instructions for inserting a first time delay following the transmitting of the first amount and inserting a second time delay following the transmitting of the second amount.

Apparatus may include a network. The network may include a plurality of apparatuses, each apparatus configured to communicate using adaptive network throttling.

Methods may include: transmitting, from the ATM to a remote computer, or from the remote computer to the ATM, a first amount of data; measuring an actual response time associated with the transmitting the first amount; selecting a second amount of data; transmitting the second amount of data; and inserting a time delay prior to transmitting the second amount, said time delay based on the actual response time.

Methods may include identifying a difference between the actual response time and a target response time.

Methods may include transferring a file from ATM. The method may include selecting a time window ("TW"); transmitting data during the TW; recording an actual response time ("ART") associated with the transmitting; and inserting a time delay ("TD") following the transmitting such that: TD=TW−ART.

Methods may include, when the data is associated with an amount, adjusting the amount after the transmitting. The adjusting may include increasing the amount when the ART is less than a target response time. The adjusting may include decreasing the amount when the ART is greater than a target response time. Methods may include not changing the amount.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

A network link may be shared by multiple devices. The multiple devices may include self-service terminals, ATMs, servers, computers, mobile phones or any suitable device configured to transmit and/or receive information via the network link. A device may perform one or more functions. Each function may be a distinct device. A function may be defined by a software application.

Each of the multiple devices may attempt to utilize the shared link by transmitting and/or receiving information. A device utilizing the shared network link may transmit information over the link without acknowledging a presence of other devices sharing the link.

The device may attempt to transmit information or otherwise utilize the shared link in a "selfish" manner—so that operation of the device is maximized. For example, the device may be aware that to perform a specific function, a communication must be completed within a specified time frame. Completion of the communication may include transmission of information and receipt of a response to the transmission utilizing the shared link. Due to unpredictability or uncontrollability of conditions on the network link, the device may attempt to transmit a large amount of information in a short time span, thereby completing the transmission in a minimal amount of time.

Such a "selfish" mode of operation may result in a negative impact on other devices sharing the network link. For example, the negative impact may include a bandwidth of the network link being fully utilized by fewer than all devices sharing the network link. Under such an operating scheme, some devices sharing the network link may not be able to timely complete a communication utilizing the network link.

Adaptive Network Throttling (hereinafter "ANT") according to the invention may include regulating communication of devices sharing a network link. ANT may include regulating communication of a device in a manner that balances a competing need of each device sharing a network link to timely complete a communication. For example, ANT may include regulating an amount of information transmitted by one or more devices sharing the link.

The regulating may be independent of a bandwidth, capacity or other characteristic of a network link. The regulating may be independent of device, network or network link hardware. Exemplary network link characteristics may depend on whether the link is wired, wireless or on any suitable link characteristic.

The regulating may be dynamically adjustable. The adjusting may be based on a selectable transmission variable and/or a measureable transmission metric.

The transmission variable may be a time window. The time window may include a period of time. The time window may include a transmission portion and a delay portion. A device may be permitted to transmit information during the transmission portion. The device may be restricted from transmitting information during the delay portion.

The delay portion may precede and/or follow the transmission portion. The time window may include a plurality of transmission portions. The time window may include a plurality of delay portions. The plurality of transmission portions may precede and/or follow a delay portion. The plurality of delay portions may precede and/or follow a transmission portion.

The restriction on transmission during the delay portion may leave "unused time" during the time window. The unused time may correspond to unused bandwidth available on the network link. For example, a first device and a second device may share a network link. The second device may begin a transmission portion during the delay portion of the first device.

As a further example, multiple self-service terminals may share the network links of an intranet. Each terminal may be configured to leave some unused time during a time window. A self-service terminal may thus be configured to leave some bandwidth available for another self-service terminal communicating over the intranet.

During the transmission portion of the time window, a device may transmit an amount of information. The amount of information may be a transmission variable. A transmission may include "pushing" the amount of information onto a network link. The amount may include one or more data packets. After "pushing" the entire amount of information onto the network link, the device may wait to receive acknowledgement that the amount of information has been received at a destination. The destination may be a remote device. The acknowledgment may be sent by the remote device.

A duration of time, beginning with the initial "push" of information onto a network link and ending with receipt of an acknowledgement, may represent an "actual response time." The actual response time may be a measureable transmission metric.

The actual response time may be affected by unknown or non-measurable conditions on a network link. Despite conditions on the network link, the actual response time may be adjustable. The actual response time may be at least partially adjustable based on a transmission variable, such as the amount of information transmitted.

For example, during a first transmission portion, a device may initiate a transfer of 4 kilobytes (kb). A period of time beginning with "pushing" the 4 kb of information onto a network link and ending with receipt of an acknowledgement that the 4 kb has been received may be about 700 milliseconds (ms).

During a second transmission portion, the device may initiate a transfer of an amount of information more than, less than or equal to 4 kb. For example, the device may initiate a transfer of 7 kb. A duration of time may begin with "pushing" the 7 kb of information onto a network link and end with receipt of an acknowledgement that the 7 kb has been received may be 750 ms. In this example, the actual response time may be 750 ms.

Following the transmission portion, the device may suspend transmission and begin the delay portion of the time window. The delay portion may include an "actual delay." The actual delay may be a measureable transmission metric. The actual delay may be based on a difference between the time window and the actual response time. The actual delay may be inserted between two transmission portions.

For example, a first time window may be set equal to 1 second(s). A device may initiate a first transfer of an amount of data equal to 4 kb. An amount of time beginning with initiating the first transfer until an acknowledgement is received may be about 700 milliseconds (ms). Upon receipt of the acknowledgement, the device may delay for the remainder of the time window, a period of about 300 ms (1 s−700 ms). The 700 ms may represent the actual response time and the 300 ms may represent the actual delay.

Following the actual delay of 300 ms, the device may initiate a second transfer of information. The second transfer may occur after the delay of 300 ms. The second transfer may occur during a second time window. The second time window may be equal to the first time window. The second time window may be dynamically adjusted based on a prior time window, actual response time, actual delay or any suitable transmission metric.

The second time window may include a second transmission portion. The device may measure an actual response time based on the second transfer. The second transfer may include a second amount of information equal to, more than, or less than a prior transfer.

As a further example, the second time window may be 1 s and the second amount may be 7 kb. Following transmission of the second amount, an amount of time until an acknowledgement is received (the "actual response time") may be 800 ms. Upon receipt of the acknowledgement, the device may begin a delay portion. The delay portion (the "actual delay") may continue for 200 ms (1 s−800 ms).

The device may transmit information in a sequence of repeating time windows. Each time window may include a transmission portion and a delay portion. The actual response time and the actual delay may be dynamically adjusted based on a transmission variable, such as the amount of information transmitted during a transmission portion.

The regulating may include measuring an experienced bandwidth. The experienced bandwidth may be a measureable transmission metric. The experienced bandwidth may be based on a selectable transmission variable and/or a measureable transmission metric.

For example, the experienced bandwidth may be based on a duration of time to complete a transfer of an amount of information. The duration may be an actual response time. The information may be transferred between an ATM and a remote computer. The transfer may utilize one or more network links to reach a destination. The amount of information transmitted divided by the duration may yield a number in units of bandwidth—bytes per second.

The experienced bandwidth may be expressed as a function of time. For example, if a time window is 1 s and an actual response time is 700 ms, the experienced bandwidth may be expressed as 70% (700 ms/1s) of the time window.

A target bandwidth may be selected. The target bandwidth may be a transmission variable. The target bandwidth may represent an ideal bandwidth utilization for a device or a group of devices.

The target bandwidth may be selected based on a level of service expected by a customer. The level of service expected by the customer may be based on a function of a device. For example, a particular software application may require that a particular target bandwidth be achieved for the device to respond to a customer request within a defined time span. The target bandwidth may correspond to the particular target bandwidth.

A target bandwidth determination may be based on historical records of a transmission metric. A target bandwidth determination may be based on historical values of a transmission variable. The target bandwidth may be expressed as function of the time window.

For example, the time window may be apportioned into a target response time and a target delay. The target response time and the target delay may each be expressed as a percentage of the time window. The target response time and the time delay together may correspond to 100% of a target time window. The percentage amount allocated to the target response time may represent a target bandwidth.

The target delay and the target response time may be selectable transmission variables. The target delay and the target response time may be adjusted based on a function of the device and/or a measureable transmission metric.

The target response time may represent an ideal bandwidth utilization. A device should ideally complete a transfer of information (transmission+acknowledgement time) within the target response time. Performance of the device and/or network link may be gauged by comparing an actual response time to the target response time. An adjustment to a transmission metric may be based on the comparing.

The target delay may represent an ideal bandwidth availability. A device should ideally suspend transmission during the target delay. Performance of the device may be gauged by comparing the actual delay to the target delay. An adjustment to a transmission metric may be based on the comparing.

As discussed above, conditions on a network link may not be easily ascertainable. A device utilizing the network link may be configured to dynamically adjust the amount of information transmitted during a transmission portion based on the experienced bandwidth. The experienced bandwidth may be based on a duration of time and/or an amount of information transmitted. The duration of time and the amount of information transmitted may be transmission metrics easily ascertainable by the device.

For example, an amount of information transmitted by a device over a network link may be adjusted such that an experienced bandwidth is within a range of the target bandwidth. A device may be configured to initially select and transmit an amount of information during the transmission portion of the time window. The device may measure an experienced bandwidth based on an actual response time associated with the amount. If the experienced bandwidth is within a range of the target bandwidth, the device may continue to transmit the initially selected amount during a subsequent transmission portion.

An experienced bandwidth that is less than the target bandwidth may indicate a measure of bandwidth availability on the network link. Prior to a subsequent transmission portion, the device may increase the amount. The increased amount may increase the experienced bandwidth and/or decrease the actual delay. A decreased actual delay may be associated with providing less "unused time" during the time window. Less "unused time" may represent less bandwidth available on the network link for other devices sharing the network link.

If the experience bandwidth is less than the target bandwidth, the device may increase the amount until the experienced bandwidth is within a range of the target bandwidth. The device may continue to increase the amount until the experienced bandwidth exceeds the target bandwidth. The increased experienced bandwidth may be associated with a decreasing actual delay.

The experienced bandwidth may be permitted to increase until the actual delay approaches a minimum value. The minimum value may be a transmission variable. The minimum value may be selected such that other devices utilizing the network link may achieve a threshold experienced bandwidth and/or a threshold level of service.

An experienced bandwidth that exceeds the target bandwidth may represent a device that is utilizing excessive bandwidth of a network link. An experienced bandwidth that exceeds the target bandwidth may negatively impact performance of other devices utilizing the network link. The negative impact may be associated with an inability of other devices to achieve their respective target bandwidth utilizations. The negative impact may be associated with devices sharing a network being unable to provide a requisite level of service to a customer.

For example, during a series of transmission portions, a device may transmit an amount of information over a network link. If the device utilizes excessive bandwidth, insufficient bandwidth may be available for other devices sharing the network link. The device may measure an experienced bandwidth based on actual response times associated with the series of transmission portions.

To reduce an experienced bandwidth, the device may decrease the amount of information transmitted in a subsequent transmission portion. Transmitting the decreased amount may increase the actual delay. The increased actual delay may represent additional bandwidth available to other devices sharing the network link.

The device may decrease the amount of information transmitted in subsequent transmission portions until the experienced bandwidth is within a range of the target bandwidth. The device may continue to decrease the amount of information transmitted in subsequent transmission portions until the experienced bandwidth is less than a target bandwidth.

Based on a measurable transmission metric, a device may be configured to adjust the amount of information transmitted, the time window, the target bandwidth or any other suitable transmission variable. A value for a selectable transmission variable may be selected based on an expected effect on a transmission metric. A value for a transmission variable may be selected to configure a device to provide an expected level of quality of service.

For example, a size of the time window may be selected such that the time window includes a sufficiently large target response time that allows for a throughput of information associated with an expected level of quality of service. A size of the time window may be selected such that the time window includes a target delay that represents sufficient residual bandwidth for other devices sharing the network link. Bandwidth sufficient for a device may be based on a function of the device or a software application associated with the device.

Each device sharing a network link may monitor its bandwidth on the shared link based on an amount of information transferred and/or the actual response time. Thus, an operator of devices configured to communicate using ANT over a network link does not require additional information from party controlling the network link. Each device may take account of a presence of other devices sharing a link by leaving "unused time" during a time window.

A network may include multiple devices that each share a network link. Each device sharing the network link may be configured to adjust a transmission variable to induce the device to behave "politely," i.e., in a manner that allows other devices to operate according to their own individual requirements with respect to bandwidth utilization on the shared network link.

Each device sharing a network link may have a different bandwidth requirement. ANT may regulate communication network connected devices so that each device obtains a requisite measure of bandwidth and leaves bandwidth for other devices sharing the network link. For example, each device may be configured with a device-specific time window and associated targets based on the function of the device or applications running on the device. Adjustment to a transmission variable associated with a device may be based on historical transmission metrics and/or prior transmission variable values associated with the device.

For example, each device sharing a network link may be configured to use a minimal amount of bandwidth needed to provide a requisite level of quality of service. Each device may be configured with a sufficiently large target delay representing sufficient bandwidth available on the network link for other devices.

Based on the experienced bandwidth, a device may detect whether the network link is "congested." If the device detects that the network link is congested, the device may attempt to reduce its experienced bandwidth. The device may attempt to dynamically adjust its associated transmission metrics such that (a) it transmits a threshold amount of information and (b) inserts a minimal delay between transmissions, the delay representing sufficient residual bandwidth for other devices.

ANT may be hardware independent. An advantage of a hardware-independent approach is easy implementation of new software applications on a network. By implementing ANT, each application may be configured to communicate "politely". Thus, there may be no need, or less of a need, for rigorous testing to detect a possible detrimental impact of the new application on overall network throughput. Communications transmitted or received from a new application may be regulated by ANT to leave sufficient bandwidth—by inserting a delay portion—for other applications/devices sharing the network.

ANT may include increasing and/or decreasing an amount of information transmitted during a transmission portion in a manner that avoids "jitter." Jitter may result when bandwidth utilization fluctuates widely. Jitter may be measured by a fluctuation of the actual response time. Jitter may be measured by comparing the actual response time to the size of the time window. Jitter may be measured by a fluctuation of the experienced bandwidth. Jitter may result in inefficient bandwidth utilization. Jitter may result in wide fluctuations in the amount of information transmitted by a device during the transmission portion of a time window.

To prevent jitter, a device may be configured to regulate a rate of increase and/or decrease of transmission variable. For example, an adjustment to the amount of information transmitted may be restricted by a selected rate or a selected increment. The device may be configured to iterate across a number of time windows, incrementally adjusting the amount of data transmitted until a desired actual response time is achieved.

Regulating the rate of transmission may include a "smoothing" algorithm. The amount of information transmitted during a time window may be calculated based on the smoothing algorithm. For example, if following a series of transmissions, an average difference between the actual response times and the target responses is above a threshold, the smoothing algorithm may quickly increase/decrease the amount of information transmitted. If a difference between the actual response times and the target responses is below a threshold, the smoothing algorithm may slowly increase/decrease the amount of information transmitted.

A device may be configured to always transmit a minimal amount of information despite detection of a congested network link. The minimum may ensure that a device may always attempt to transmit some information.

A minimal amount may be selected to avoid transmitting information with excessive overhead. For example, if a device transmits packets, a minimal amount may be selected to avoid transmitting a packet that includes a header disproportional to a size of the packet.

A device may be configured to avoid transmission of a maximum amount of information. The maximum may be an upper limit on the amount of information that may be transmitted during a transmission portion.

If transmission of an amount of information fails, a device may be configured to re-transmit. The device may be configured to re-transmit the previously transmitted amount. The device may be configured re-transmit an adjusted amount. The adjustment may correspond to an increase or a decrease. The device may be configured to select an amount of information for re-transmission based on a past transmission or transmissions. A transmission failure may occur if the device fails to receive an acknowledgment from the destination.

The measureable transmission metrics and/or selectable values of transmission variables associated with communication of a device over a network link may be logged. The log may include historical time windows, transmission portions, delay portions, actual response time, actual delays, targeted response times, targeted delays, experienced bandwidths, target bandwidths or any suitable transmission metric or variable. The adjustment or selection of a transmission variable may be based, at least in part, on the log.

For example, in selecting or adjusting an amount of information, a device may be configured to compute an average actual response time. The average actual response time may be based on logged actual response times. Based on the computed average, the amount may be increased or decreased.

Based on the log, statistics relating to communication of a device may be computed. For example, ANT may be used to transfer files from an ATM. Each file may be transferred across a sequence of time windows. Within the transmission portion of each time window, a portion of the file may be transferred. The amounts transferred during a total number of transmission windows may represent the entire file. Exemplary statistics derived from transfers may include:

Average transfer amount per file transferred
Maximum transfer amount per file transferred
Total time for a file transfer
Total delay time for a file transfer
Overall average transfer amount
Overall maximum transfer amount
Overall average actual response time
Overall average experience bandwidth ANT may include generating a notification. A generated notification may be logged. The logged notifications may be analyzed. The logged notifications may indicate that there is insufficient bandwidth available on a particular network link. Action may then be taken to increase the available bandwidth.

A notification or alert may be generated based on a detected condition on a network link. For example, an alert may be generated each time an actual response time exceeds a target response time.

An alert or notification may only be generated if a threshold value is exceeded. For example, a notification may only be generated if an actual response time exceeds the target response time a threshold number of times. A notification may only be generated if an actual response time exceeds the target time window a threshold number of times. If a threshold number of devices are all generating a threshold number of notifications, there may not be sufficient bandwidth available on a network link. The threshold number of notifications may provide notice of congestion on the network link or a failure of the network link.

ANT may be configured to assign a priority to specific communications. The priority may be based on a content of a communication. The priority may include assigning a specific value to a transmission variable. The priority may include a suspension of ANT for a communication.

ANT may be configured to regulate specific communications. For example, ANT may only be used to transfer files larger than a threshold size. ANT may only be used to transfer a specific file to a specific destination. For example, ANY may be used to upload scanned check images from an ATM to a remote computer. ANT may only be used in conjunction with a transmission associated with a particular software application. For example, ANT may not be used to regulate transmission of notifications or may only be used for FTP transfers.

Apparatus and methods for adaptive network throttling are provided. Apparatus may include an ATM configured to communicate using adaptive network throttling. The ATM may communicate with a device, a network, a plurality of devices, a plurality of networks or any suitable number or type of device and/or network. The communication may include a transfer of information. The ATM may utilize adaptive network throttling for local, internal, remote or any suitable communication over any suitable network.

The communication may include receiving information, transmitting information or any suitable transfer of information. The communication may be restricted to a transfer of a particular type of information. For example, the communication may be limited to a transfer of images or a file larger than a threshold size.

Apparatus may include one or more computer-readable media storing computer-executable instructions, that when executed by a processor on a computer system regulate communication of an ATM. The computer executable instructions may include instructions for transmitting a first amount of data; measuring a first experienced bandwidth based on the transmitting of the first amount; transmitting a second amount of data; measuring a second experienced bandwidth based on the transmitting of the second amount; and selecting the second amount of data based on the first experienced bandwidth.

The apparatus may include computer executable instructions for inserting a first time delay following the transmitting of the first amount and inserting a second time delay following the transmitting of the second amount. The apparatus may include computer-executable instructions for selecting a second amount that is not less than a minimum amount and not more than a maximum amount.

The minimum amount may ensure that the ATM transmits a sufficient minimal amount of data to timely respond to a customer. The maximum amount may ensure that the ATM does not utilize an amount of bandwidth that negatively impacts other transmitting devices sharing a network link.

The apparatus may include computer-executable instructions for selecting a time window ("TW"); measuring a duration of the transmitting of the first amount ("$DOT_1$"); setting the first delay equal to: $TW-DOT_1$; measuring a duration of the transmitting of the second amount ("$DOT_2$"); and setting the second delay equal to: $TW-DOT_2$.

The duration of a transmitting may begin with an initial "push" of data onto a network. The duration of a transmitting may end upon receiving an acknowledgement that the amount of data has been received at a destination. The duration of a transmitting may correspond to an actual response time.

The transmitting of the first amount may include a plurality of transmittings. The computer executable instructions may include instructions for: selecting the second amount such that, based on the plurality of transmittings, a projected $DOT_2$ is less than the $DOT_1$; and selecting the second amount such that, based on the transmittal of the plurality of first amounts, a projected $DOT_2$ is greater than the $DOT_1$. The projection may be based on the log or statistics generated based on the log.

The apparatus may include computer-executable instructions for transmitting a third amount of data following the first time delay and inserting a third time delay between the transmitting of the third amount and the transmitting of the second amount.

Apparatus may include a network. The network may be an intranet. The network may include a plurality of apparatuses, each apparatus configured to communicate using adaptive network throttling. The plurality of apparatuses may be a plurality of ATMs.

The plurality of apparatuses may be configured to operate such that an experienced bandwidth of each of the plurality of apparatuses ranges between a minimum and a maximum. Each apparatus may include computer-executable instructions for controlling the experienced bandwidth of the apparatus, the control based on a target bandwidth associated with each apparatus.

Methods of adaptive network throttling are provided. Methods may include a method of communication for use with an ATM. Methods may include: transmitting, from the ATM to a remote computer, or from the remote computer to the ATM, a first amount of data; measuring an actual response time associated with the transmitting the first amount; selecting a second amount of data; transmitting the second amount of data; and inserting a time delay prior to transmitting the second amount, said time delay based on the actual response time.

Methods may include identifying a difference between the actual response time and a target response time. Methods may include, when the actual response time is a first actual response time, selecting the second amount of data to reduce a second actual response time, the second actual response time based on the transmitting of the second amount. Methods may include when the actual response time is a first actual response time, selecting the second amount of data to increase a second actual response time, the second actual response time based on the transmitting of the second amount.

Methods may include selecting the second amount of data such that an expected difference between of the transmitting of the second amount and a target response time is less than a difference between the actual response time associated with the transmitting of the first amount and the target duration.

Methods may include selecting the second amount of data such that a second difference between actual response time associate with the second transmitting and the target response time is larger than a first difference between the actual response time of the first transmitting and the target response time.

The expectation may be based on the historical of transmission variables and/or metrics. The expectation may be based on statistics generated based on the log.

Methods may include selecting the second amount of data that is not less than a minimum amount of data. The method may include selecting the second amount of data that is not more than a maximum amount of data.

Methods may include, when the first amount comprises a plurality of first amounts: transmitting each of the first amounts; measuring the actual response time associated with each transmitting; comparing each actual response time to a target response time and selecting the second amount based on the comparing.

Methods may include selecting the second amount after an interval of time, the interval including at least two actual response times. Methods may include selecting the second amount after the transmitting of the plurality of first amounts. Methods may include adjusting the time delay based on the actual response time.

Methods may include transferring a file from an ATM. The method may include selecting a time window ("TW"); transmitting data during the TW; recording an actual response time ("ART") associated with the transmitting and inserting a time delay ("TD") following the transmitting such that:

$$TD=TW-ART.$$

Methods may include, when the data is associated with an amount, adjusting the amount after the transmitting. The adjusting may include increasing the amount when the ART is less than a target response time. The adjusting may include decreasing the amount when the ART is greater than a target response time. Methods may include not changing the amount. Methods may include selecting a rate of the adjusting, the rate based on a difference between the ART and a target response time.

The transmitting may include $Transmitting_{i, i=1, 2, 3, 4 \ldots I}$. The ART may include an $ART_i$ associated with a corresponding $Transmitting_i$. The TD may include a $TD_i$ associated with a corresponding $ART_i$. Each $TD_i$ may be defined by $TD_i=TW-ART_i$. The inserting may include, after each $Transmitting_i$, inserting the corresponding $TD_i$. Methods may include adjusting an amount associated with the data after $Transmitting_{i=I}$.

Methods may include adjusting the amount of data based on each $ART_{i, i=1, 2, 3, 4 \ldots I}$. Methods may include adjusting the amount of data based on an average value of each $ART_{i, i=1, 2, 3, 4 \ldots I}$. Methods may include adjusting the amount of data based on each $TD_{i, i=1, 2, 3, 4 \ldots I}$. Methods may include adjusting the amount of data based on an average value of each $TD_{i, i=1, 2, 3, 4 \ldots I}$. The adjusting may include selecting the amount based on logged values of transmission metrics or logged values of transmission variables.

The transmitting may include $Transmitting_{k, k=1, 2, 3, 4 \ldots K}$. $Transmitting_{k=1}$ may occur following $Transmitting_{k=I}$. The ART may include an $ART_k$ associated with each $Transmitting_k$. The TD may include a $TD_k$ associated with each $Transmitting_{k, k=1, 2, 3, 4 \ldots K}$. The inserting may include inserting the $TD_k$ following each $Transmitting_k$.

Methods may include adjusting the amount of data prior to $Transmitting_{k=1}$. The adjusting may include selecting the amount to obtain, after $Transmitting_{k=K}$, an average $ART_k$ that is less than an average $ART_i$. The adjusting may include selecting the amount of data to obtain, after $Transmitting_{k=K}$, an average $ART_k$ that is greater than an average $ART_i$.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
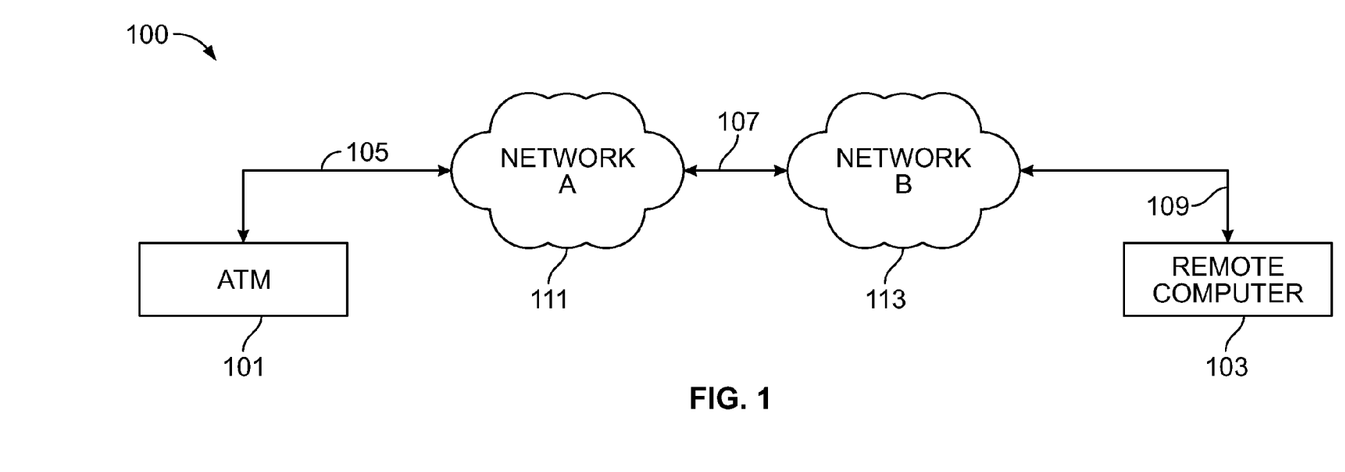
FIG. 1 shows an illustrative network link that may be used in accordance with principles of the invention.

FIG. 1 shows illustrative network link 100. Network link 100 shows a connection between ATM 101 and remote computer 103. Network link 100 may include multiple network links, such as network links 105, 107 and 109. Network link 100 may include one or more networks such as 111 and 113. Each of networks 111 and 113 may include multiple devices that share network links 105, 107 and 109. Each device may be configured to communicate over the network links 105, 107 and 109 using adaptive network throttling.

Adaptive network throttling may regulate communication between ATM 101 and remote computer 103. Adaptive network throttling may regulate communication of each of the multiple devices that share network links 105, 107 and 109.

Figure 2:
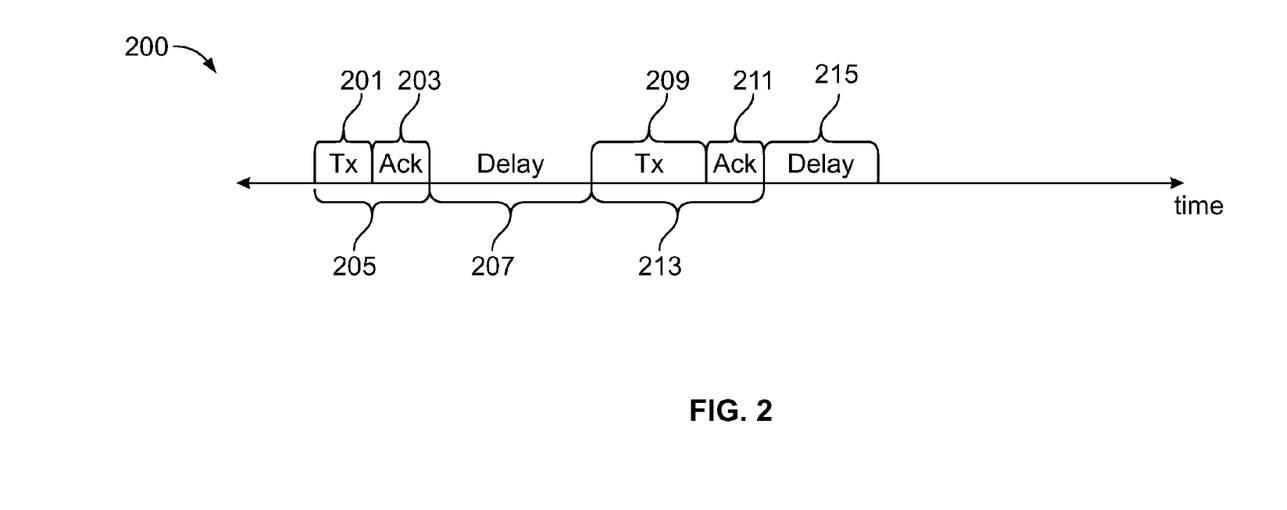
FIG. 2 shows illustrative transmittal information that may be used in accordance with principles of the invention.

FIG. 2 shows illustrative transmittal information 200. Transmittal information 200 is measured in units of time. Time period 201 represents an amount of time for a device, such as an ATM, to "push" an amount of information onto a network link. The network link may be network link 105. Time period 203 represents an amount of time from the end of time period 201 until receipt of an acknowledgement. The acknowledgement confirms that the amount of information transmitted during 201 has been received at a destination. Time period 205 represents a duration of the transmitting. The duration of the transmitting may be an actual response time. Time period 205 may occur during a transmission portion of a time window (see FIG. 3, item 301).

Following time period 205, delay period 207 is inserted. During delay period 207, no information is transmitted. Delay portion 207 may occur during a delay portion of a time window (see in FIG. 3, items 301 and 305). Delay 207 may reflect bandwidth made available for another device. Following delay period 207, a device may initiate another transmittal of information during time period 209. Based on a duration of time periods 201, 203, or 207, a transmission metric may be adjusted.

Adaptive network throttling may include a sequence of actual response times (such as 205 and 213), interspersed with a sequence of delay periods (such as 207 and 215). Each delay period may correspond to bandwidth made available for other devices to utilize.

Each actual response time, such as 205 or 213 may vary based on the amount of data transmitted during periods 201 and 209. Each actual response time, such as 205 or 213 may vary based on a network condition such as bandwidth available on a network link. The bandwidth available may increase or decrease time periods 201, 203, 209, or 211. Delay portions 207 and 215 may vary based on time periods 205 or 213.

Figure 3:
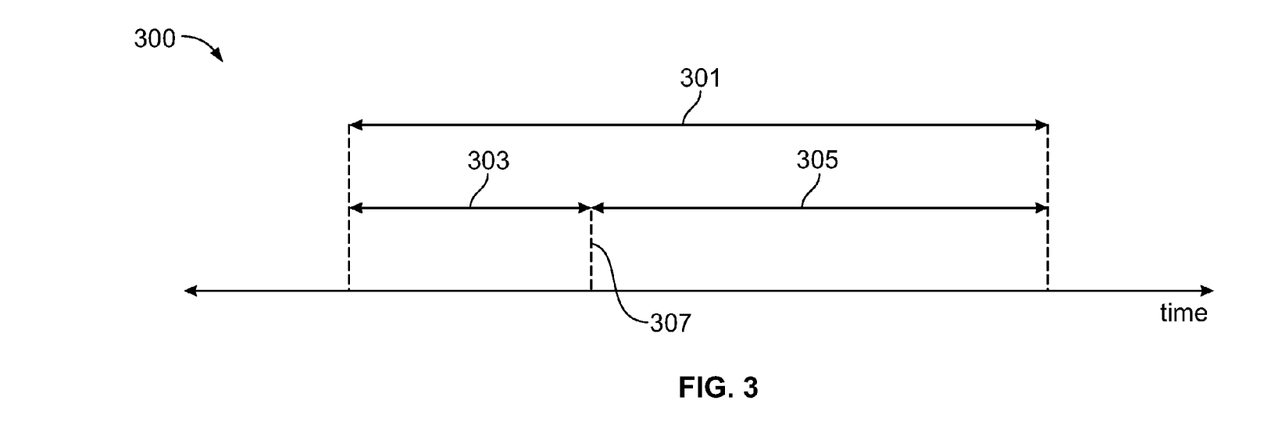
FIG. 3 shows illustrative transmittal information that may be used in accordance with principles of the invention.

FIG. 3 shows illustrative transmittal information 300. Transmittal information 300 includes time window 301. Time window 301 may be divided into transmission portion 303 and delay portion 305. Transmission portion 303 may include a duration of transmitting such as durations 201 or 209 (shown in FIG. 2). Transmission portion 303 may include an acknowledgement portion such as 203 or 211 (shown in FIG. 2). Transmission portion 303 may be longer or shorter than an actual response time such as actual response times 205 or 213 (shown in FIG. 2). Transmission portion 303 may correspond to a target response time. The target response time may reflect an ideal bandwidth utilization, in units of time, for a device.

Time window 301 includes delay portion 305. Delay portion 305 may longer, shorter or equal to delay periods 207 or 215 (shown in FIG. 2). Delay portion 305 may correspond to a target delay. The target delay may correspond to an ideal delay, calculated to balance bandwidth requirements of the transmitting device and bandwidth requirements of other devices sharing a network link.

Transmittal information 300 includes bandwidth 307. Bandwidth 307 may be expressed as a function of time window 301. Bandwidth 307 may represent a target bandwidth. Bandwidth 307 may represent an experienced bandwidth. Bandwidth 307 may be measured for a network link without knowing a bandwidth or network conditions on the network link.

Figure 4:
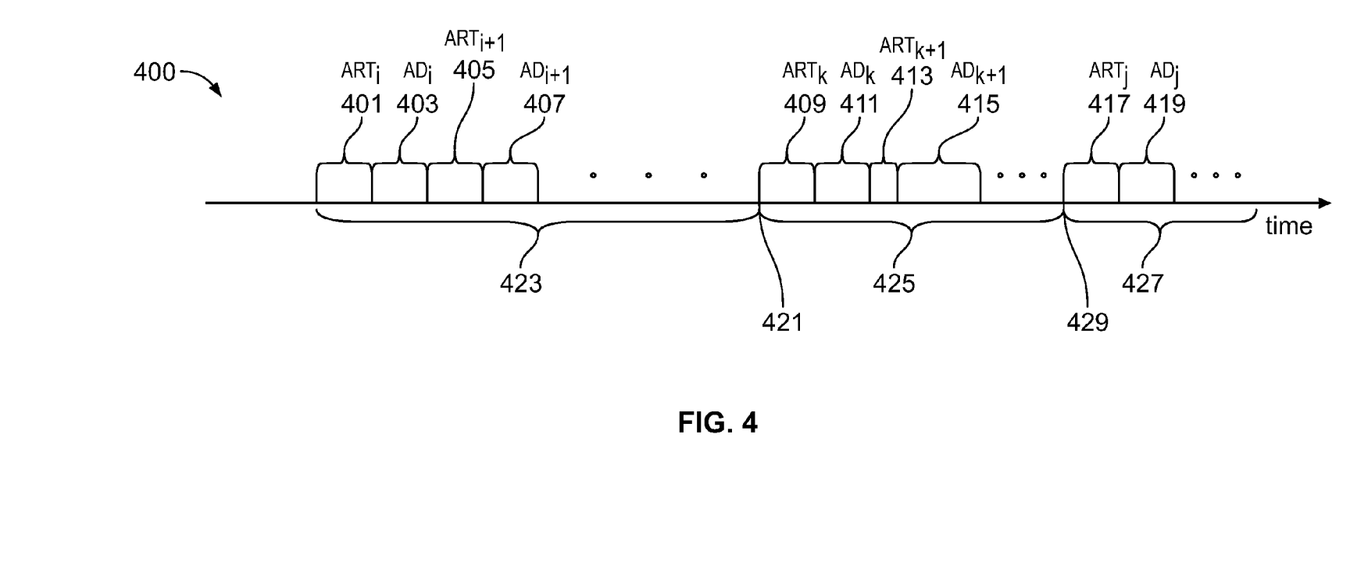
FIG. 4 shows illustrative transmittal information that may be used in accordance with principles of the invention.

FIG. 4 shows illustrative transmittal information 400. Transmittal information 400 includes sequences 423, 425 and 427. Sequence 423 includes actual response times ("$ART_i$") and actual delays ("$AD_i$") associated with each $Transmitting_{i,\ i=1,\ 2,\ 3,\ 4\ldots I}$ (not shown). Each $Transmitting_i$ is associated with a corresponding $ART_i$ and a corresponding $AD_i$. Each $ART_i$ may correspond to period of time beginning with an initialization of a $Transmitting_i$ associated with an amount of information and ending upon receipt of an acknowledgement. At 421, following $Transmitting_{i=I}$, the amount of information may be adjusted. The amount may be adjusted based on $ART_{i,\ i=1,\ 2,\ 3,\ 4\ldots I}$.

Sequence 425 includes actual response times ("$ART_k$") and actual delays ("$AD_k$") for each $Transmitting_{k,\ k=1,\ 2,\ 3,\ 4\ldots K}$ (not shown). Each $Transmitting_k$ may be associated with a corresponding $ART_k$ and a corresponding $AD_k$. Each $ART_k$ may correspond to period of time beginning with an initialization of a $Transmitting_k$ associated with the adjusted amount of information and ending upon receipt of an acknowledgement. At 429, following $Transmitting_{k=K}$, the amount of information may be adjusted again.

Following $Transmitting_{k=K}$, the adjusted amount may be transmitted in sequence 427.

A device configured to communicate using adaptive network throttling may dynamically adjust the amount of information transmitted based on one or more actual response times. An actual response time may correspond to a bandwidth.

Figure 5:
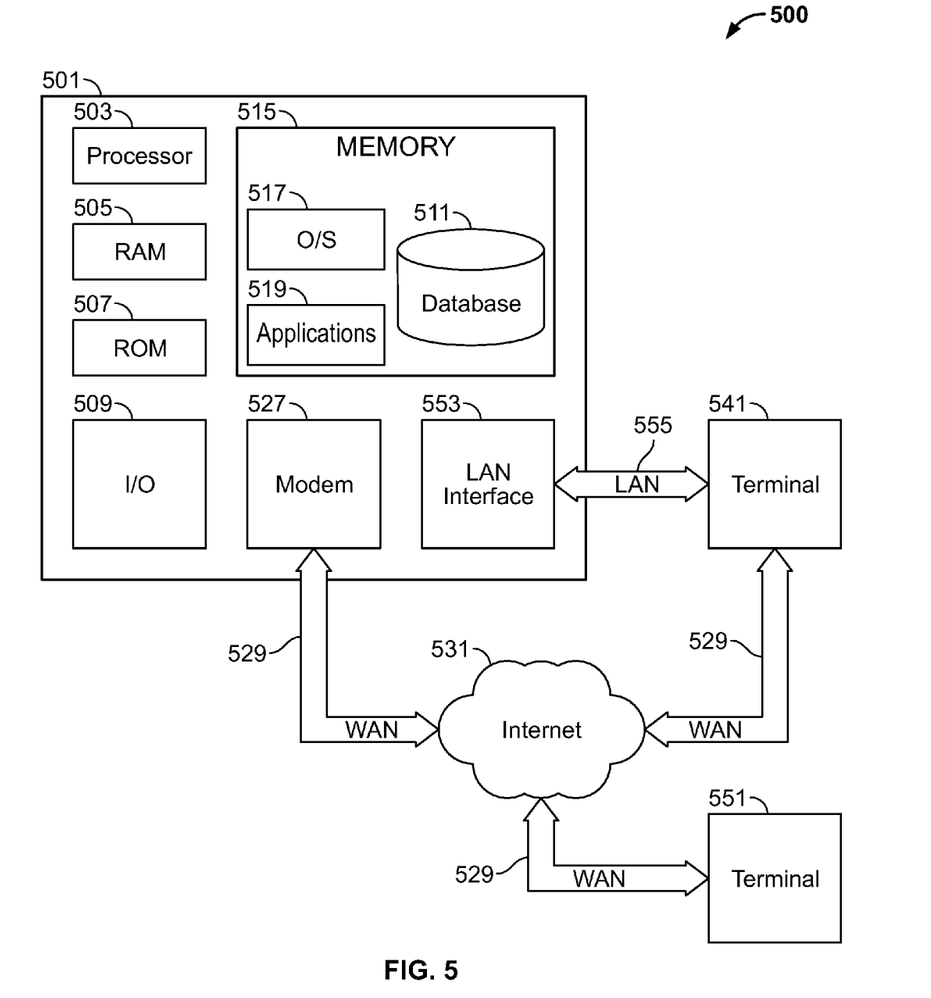
FIG. 5 shows a schematic diagram of a general purpose digital computing environment in which one or more aspects of the present invention may be implemented.

FIG. 5 is a block diagram that illustrates a generic computing device 801 (alternatively referred to herein as a "server") that may be used in accordance with the principles of the invention. Server 501 may be included in any suitable apparatus that is shown or described herein.

Server 501 may have a processor 503 for controlling overall operation of the server and its associated components, including RAM 505, ROM 507, input/output module 509, and memory 515.

Input/output ("I/O") module 509 may include a microphone, keypad, touch screen, and/or stylus through which a user of device 501 may provide input, and may also include one or more of a speaker for providing audio output and a video display device for providing textual, audiovisual and/or graphical output. Software may be stored within memory 515 and/or storage to provide instructions to processor 503 for enabling server 501 to perform various functions. For example, memory 515 may store software used by server 501, such as an operating system 517, application programs 519, and an associated database 511. Alternatively, some or all of server 501 computer executable instructions may be embodied in hardware or firmware (not shown). Database 511 may provide storage for time windows, delay portions, transmission portions, target response times, target delays, actual response times, target bandwidths, experienced bandwidths, logged metrics/variables and/or any other suitable information.

Server 501 may operate in a networked environment supporting connections to one or more remote computers, such as terminals 541 and 551. Terminals 541 and 551 may be servers that include many or all of the elements described above relative to server 501. The network connections depicted in FIG. 5 include a local area network (LAN) 555 and a wide area network (WAN) 529, but may also include other networks such as an intranet. When used in a LAN networking environment, computer 501 is connected to LAN 555 through a network interface or adapter 553. When used in a WAN networking environment, server 501 may include a modem 527 or other means for establishing communications over WAN 529, such as Internet 531. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 519, which may be used by server 501, may include computer executable instructions for invoking user functionality related to communication, such as email, short message service (SMS), and voice input and speech recognition applications.

Computing device 501 and/or terminals 541 or 551 may also be mobile terminals including various other components, such as a battery, speaker, and antennas (not shown).

Terminal 551 and/or terminal 541 may be portable devices such as a laptop, cell phone, blackberry, or any other suitable device for storing, transmitting and/or transporting relevant information.

Any information described above in connection with database 511, and any other suitable information, may be stored in memory 515.

One or more of applications 519 may include one or more algorithms that may be used to implement adaptive network throttling.

Figure 6:
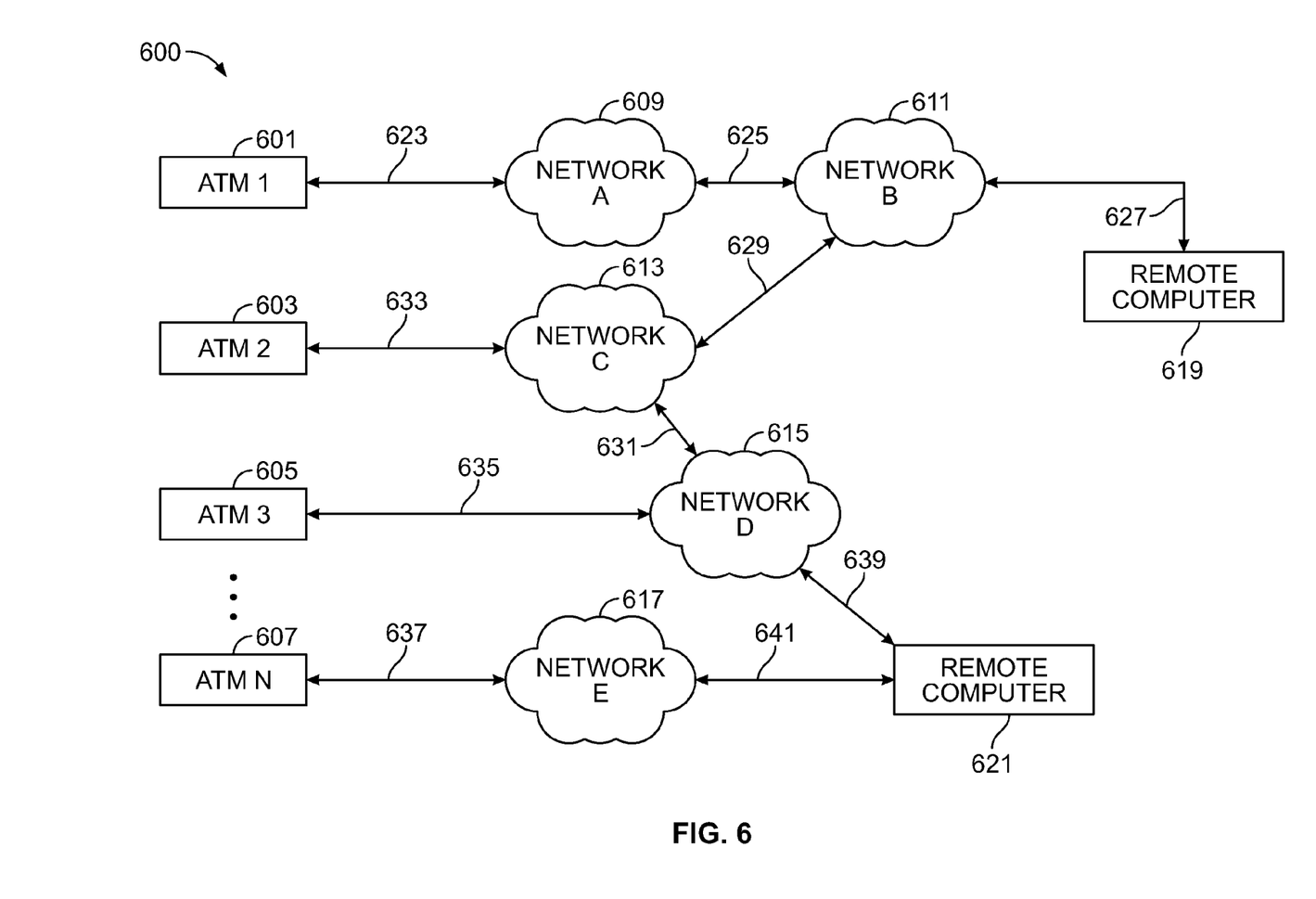
FIG. 6 shows an illustrative network in accordance with principles of the invention.

FIG. 6 shows illustrative network 600. Network 600 may be an intranet. Network 600 includes devices 601, 603, 605 and 607 that are configured to communicate with remote computers 619 or 621. Each device connected to network 600 may be configured to communicate using adaptive network throttling. Adaptive network throttling may regulate communication between the network connected devices independent of a network link, such as links 633 or 639, and independent of a network utilized by a device, such as network 609 or 615.

Figure 7:
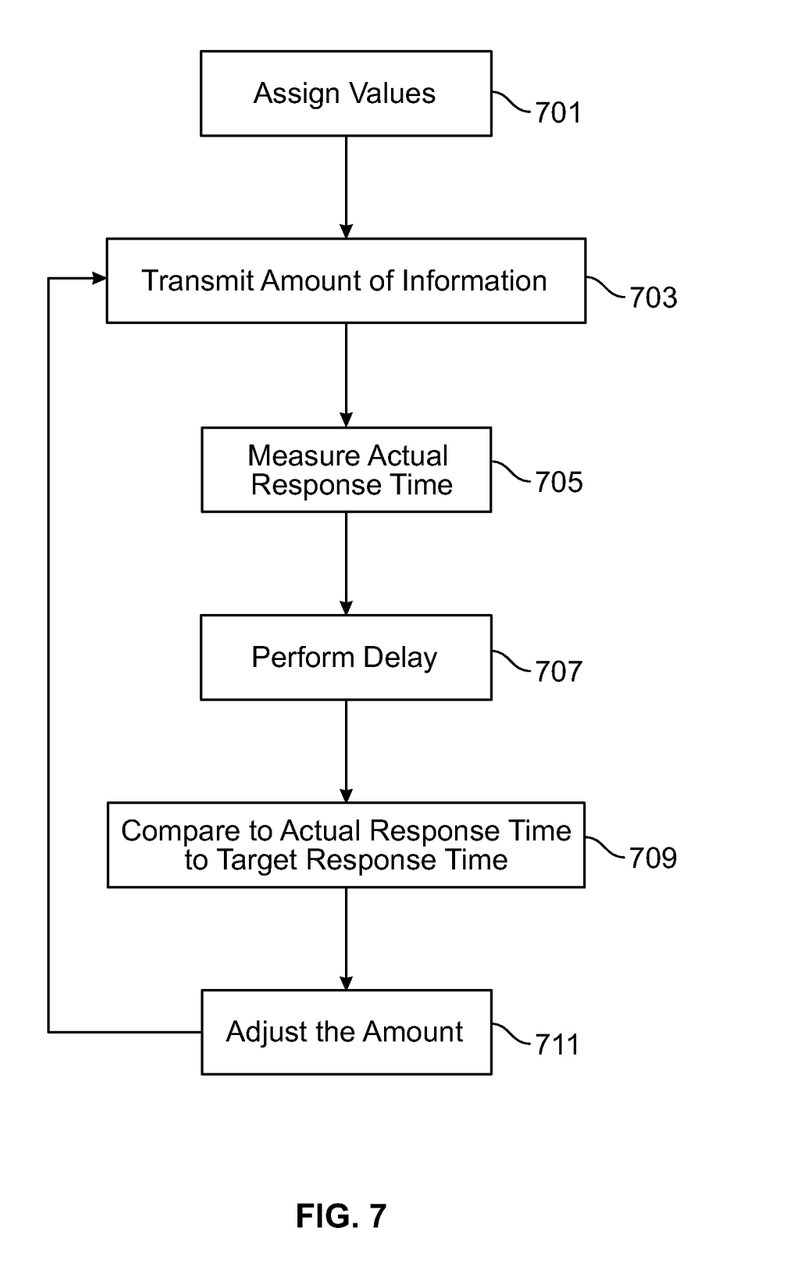
FIG. 7 shows an illustrative process in accordance with principles of the invention.

FIG. 7 shows illustrative steps that may be taken by systems and methods for adaptive network throttling (referred to hereinafter, collectively, as "the system") in accordance with principles of the disclosure.

At step 701, the system assigns values to a transmission metric. The transmission metric may include a time window, a target response time, a target delay, an amount of information or a target bandwidth (see FIGS. 2-4). At step 703, the system transmits the amount of information utilizing a network link. At step 705, the system measures an actual response time associated with the amount.

At step 707, the system performs a time delay. The time delay may correspond to a difference between the time window and the actual response time. At step 709, the system compares the actual response time to a target response time. Based on the comparison 709, at step 711, the system adjusts the amount. Following the adjustment the amount may remain the same, increase or decrease. After step 711, the system returns to step 703 and transmits the adjusted amount.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Thus, methods and apparatus for adaptive network throttling have been provided. Persons skilled in the art will appreciate that the present invention can be practiced by other than the described embodiments, which are presented for purposes of illustration rather than of limitation, and that the present invention is limited only by the claims that follow.

What is claimed is:

1. A method of communication, the method for use in communicating with an automated teller machine ("ATM"), the method comprising:
    transmitting, from the ATM to a remote computer, or from the remote computer to the ATM, a first amount of data;
    measuring an actual response time associated with the transmitting the first amount of data;
    selecting a second amount of data;
    transmitting the second amount of data; and
    inserting a time delay prior to transmitting the second amount of data, said time delay based on the actual response time.

2. The method of claim 1, the measuring comprising identifying a difference between the actual response time and a target response time.

3. The method of claim 2, when the actual response time is a first actual response time, the selecting comprises selecting the second amount of data to reduce a second actual response time, the second actual response time based, at least in part, on the transmitting the second amount of data.

4. The method of claim 2, when the actual response time is a first actual response time, the selecting comprises selecting the second amount of data to increase a second actual response time, the second actual response time based, at least in part, on the transmitting the second amount of data.

5. The method of claim 1, further comprising selecting the second amount of data that is not less than a minimum amount of data.

6. The method of claim 1, further comprising selecting the second amount of data that is not more than a maximum amount of data.

7. The method of claim 1, further comprising, when the first amount of data comprises a plurality of first amounts of data:
transmitting each of the first amounts of data;
measuring the actual response time associated with each transmitting;
comparing each actual response time to a target response time; and
selecting the second amount of data based on the comparing.

8. The method of claim 7 further comprising selecting the second amount of data after an interval of time, the interval comprising at least two actual response times.

9. The method of claim 7 further comprising selecting the second amount of data after the transmitting of the plurality of first amounts.

10. The method of claim 1 further comprising adjusting the time delay based on the actual response time.

11. A method of transferring a file from an automated teller machine ("ATM"), the method comprising:
selecting a time window ("TW");
transmitting data during the TW;
recording an actual response time ("ART") associated with the transmitting; and
inserting a time delay ("TD") prior to, or following, the transmitting such that: TD=TW−ART.

12. The method of claim 11, when the data is associated with an amount, the method further comprises adjusting the amount after the transmitting.

13. The method of claim 12, further comprising increasing the amount when the ART is less than a target response time.

14. The method of claim 12, further comprising decreasing the amount when the ART is greater than a target response time.

15. The method of claim 12 further comprising selecting a rate of the adjusting, the rate based on a difference between the ART and a target response time.

16. The method of claim 11, when:
the transmitting comprises:
Transmitting$_{i,\ i=1,2,3,4\ldots I}$;
the ART comprises:
an ART$_i$ associated with a corresponding Transmitting$_i$;
the TD comprises:
a TD$_i$ associated with a corresponding ART$_i$;
the inserting comprises:
after each Transmitting$_i$ inserting the corresponding TD$_i$; and
the method further comprises adjusting an amount associated with the data after Transmitting$_{i=I}$.

17. The method of claim 16, the method further comprising adjusting the amount of data based on an average of ART$_{i,\ i=1,2,3,4\ldots I}$.

18. The method of claim 16, the method further comprising adjusting the amount of data based on an average of TD$_{i,\ i=1,2,3,4\ldots I}$.

19. An apparatus comprising one or more non-transitory computer-readable media storing computer-executable instructions, that when executed by a processor on a computer system regulates communication of an automated teller machine ("ATM"), the instructions comprising instructions for:
transmitting a first amount of data;
measuring a first experienced bandwidth based on the transmitting of the first amount of data;
transmitting a second amount of data;
measuring a second experienced bandwidth based on the transmitting of the second amount of data; and
selecting the second amount of data based on the first experienced bandwidth.

20. The apparatus of claim 19 further comprising computer-executable instructions for:
inserting a first time delay following the transmitting of the first amount of data; and
inserting a second time delay following the transmitting of the second amount of data.

21. The apparatus of claim 19 further comprising computer-executable instructions for selecting the second amount of data that is:
not less than a minimum amount of data; and
not more than a maximum amount of data.

22. The apparatus of claim 20 further comprising computer-executable instructions for:
selecting a time window ("TW");
measuring a duration of the transmitting of the first amount ("DOT$_1$");
setting the first delay equal to: TW−DOT$_1$;
measuring a duration of the transmitting of the second amount ("DOT$_2$"); and
setting the second delay equal to: TW−DOT$_2$.

23. The apparatus of claim 20 further comprising computer-executable instructions for:
transmitting a third amount of data following the first time delay; and
inserting a third time delay between the transmitting of the third amount of data and the transmitting of the second amount of data.

24. A network comprising a plurality of the apparatus of claim 19.

25. The network of claim 24, each apparatus further comprising computer-executable instructions for controlling the experienced bandwidth of the apparatus, the control based on a target bandwidth associated with each apparatus.

* * * * *